United States Patent Office 3,526,745
Patented Sept. 1, 1970

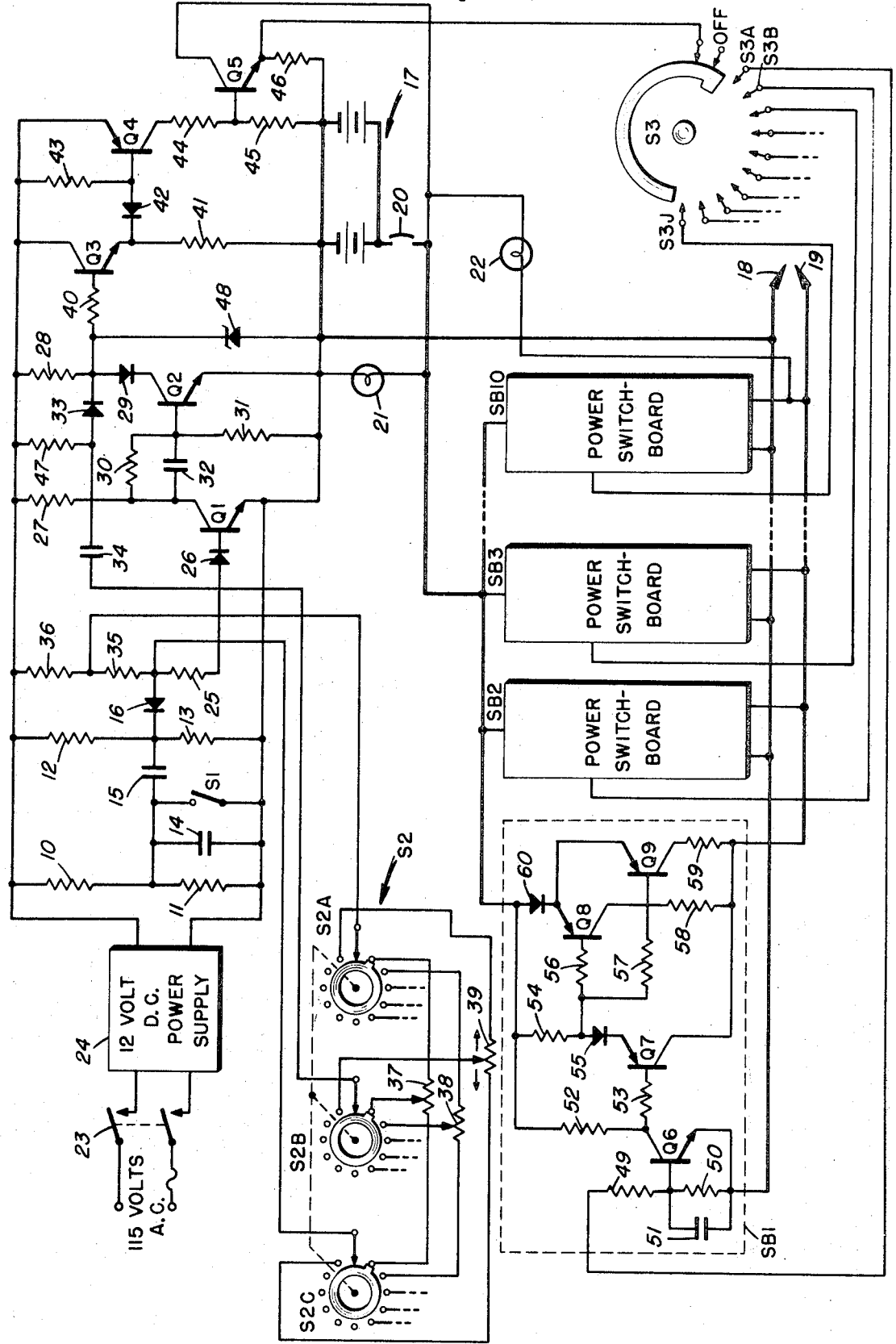

3,526,745
WELDING MACHINE
Algimantas A. Dargis, Laurel, Md., assignor to the United States of America as represented by the Secretary of the Navy
Filed Sept. 12, 1966, Ser. No. 578,891
Int. Cl. B23k 11/24
U.S. Cl. 219—108                                6 Claims

ABSTRACT OF THE DISCLOSURE

A power supply for a resistance welding machine includes a power source connected to a variable pulse control and a variable impedance device interconnecting the pulse control to a pair of electrodes in series relationship. The pulse control comprises a one-shot multivibrator with a variable resistance device for establishing a desired pulse width. The variable impedance device comprises a transistor switching board which includes parallel connected resistors with series connected transistor switches associated with each resistor. A mechanical switch selectively interconnects the pulse control with various ones of the transistor switches for establishing the desired impedance and thus controlling the amplitude of the welding pulse.

---

The present invention generally relates to welding machines and, more particularly, pertains to an improved resistance welder which is very versatile, in that it can be used to weld various materials, and which is capable of producing the reliable welds needed in satellite circuit construction, for example.

The most commonly used circuit in presently available commercial resistance welders of small size is basically a capacitor which can discharge into the primary coil of a pulse transformer when a relay switch is closed; the secondary winding of the transformer being connected to the welder electrodes. When the welding pulse from such a circuit is displayed on an oscilloscope, as a function of voltage and time, the trace resembles roughly a half-cycle of a sinewave. These commercially available welders permit the setting of two variables: the capacitor voltage and the pressure of the electrodes upon the work. Thus, if in attempting to make a weld more heat is deemed necessary, it is generallby obtained by increasing the capacitor voltage, since the duration of the pulse is limited by the transformer and cannot be easily changed. As a consequence, increases in welding heat are always accompanied by increases in current density.

Since the heat generated in the weld area is proportional to the square of the current, it becomes clear that the instrument settings become very critical and the normal variations in environment and machine components have made the time-to-time variability of any given machine an exasperating problem, necessitating frequent calibartion and checking. Moreover, in spite of the manufacturer's close control over the capacitors, the unavoidable variation in transformers has prevented reproducibility of weld pulse from machine to machine, and cause individual welding machines to be sufficiently different from one another so as to thereby require the welder manufacturers to make up complex schedules of settings for welding a given pair of materials on different machines produced by the same manufacturer.

Another quite serious draw-back with commercially available resistance welders is in the fact that they use conventional power supplies (including capacitors and inductors), so that an excessive change in welding current is often observed as a result of the unavoidable change in resistance in the weld, as it is being formed. Since these weld resistance changes are sometimes unpredictable and occasionally very great, the energy expended within the weld may be disastrously small. At the other extreme, it is sometimes observed that high frequency oscillations are set in motion by these weld resistance changes and spitting or small explosions result at the weld. This is equally disastrous to weld reliability. In addition, these weld resistance changes are often caused to be far more serious than they would otherwise be, in view of the relatively large inductance and capacitance values that are present in the commercially available welding circuits.

Keeping the above-mentioned shortcomings of the prior art in mind, it is proposed in accordance with the present invention to provide an improved resistance welder capable of producing a welding pulse whose current magnitude and duration can be independently controlled to a high degree of accuracy, so that the welder has improved versatility. Moreover, the amplitude of the welding current pulse produced by the proposed welder remains substantially constant at a selected predetermined value regardless of changes in resistance at the weld being made. This latter feature causes the welder operation to remain constant from day to day and from machine to machine, so that the need for daily checks, calibrations and lengthy setting schedules are obviated.

The improved resistance welder of the present invention basically comprises a D.C. battery power source; transistorized circuitry to control the magnitude and duration of the welding current pulse; and, a commercially available welding head. The power source and control circuitry are characterized by the absence of transformers and capacitors which introduced variations in the weld pulse of prior art machines, as previously discussed.

More specifically, a transistorized one-shot multivibrator circuit is employed to produce a square wave control pulse which is used to selectively trigger one or more of a plurality of parallel connected, transistorized switching boards which are connected in series between the D.C. battery power source and the welding tips. This one-shot multivibrator is accurately controlled by the operator, in a manner to be described in detail hereinafter, to produce a selected pulse width at its output, depending upon the desired duration of the welding pulse. The magnitude of the weld pulse is then controlled accurately by selecting the proper number of transistorized switching boards to be triggered by the square wave control pulse from the one-shot; i.e., as more and more of the switching boards are triggered, the impedance in series with the D.C. battery source and welding tips is decreased and the welding current pulse amplitude is consequently increased a proportionate amount. Moreover, even while triggered, the impedance value within each transistorized switching board is kept very large, relative to the resistance values experienced at the weld, in order to eliminate any variations in the weld current amplitude, as the weld is made.

In view of the foregoing, one object of the present invention is to provide an improved resistance welder capable of reliably welding various materials.

A further object of the present invention is to provide a resistance welder wherein the amplitude and duration of the welding current pulse can be independently controlled with a high degree of accuracy Another object of the present invention is to provide a resistance welder wherein the welding current pulse remains relatively constant amplitude, regardless of changes in the resistance of the material being welded.

Another object of the present invention is to provide a resistance welder employing a D.C. battery power supply to produce the welding current pulse.

Other objects, purposes and characteristic features of the present invention will in part be pointed out as the description of the present invention progresses and in part be obvious from the accompanying drawing which represents a detailed schematic of circuitry embodying the improved resistance welder of the present invention.

Referring now to the drawing, the transistors Q1 and Q2, together with their associated circuitry, form a conventional one-shot multivibrator capable of producing a substantially square output control pulse when triggered. As will be described in more detail hereinafter, the duration of this one-shot output control pulse is, in turn, controlled by the setting of switch S2, such that the pulse duration can either be varied manually or can be preset to any one of a number of discrete values. The resistors 10 through 13, capacitors 14 and 15 and diode 16 form a pulse forming network capable of supplying a trigger pulse to the one-shot multivibrator Q1–Q2 each time the foot operated switch S1 is closed.

The output control pulse from the one-shot multivibrator is connected to pulse power amplifier circuitry comprising transistors Q3, Q4 and Q5. After proper power amplification by these transistor stages, the control pulse is applied to the wiper arm of a selector switch S3, shown in the lower right-hand corner of the drawing.

A plurality of power switchboards SB1 through SB10 are illustrated in the drawing and are connected in parallel with one another and in series between the battery power supply 17 and the welding tips 18 and 19. As will be described in more detail hereinafter, these switchboards SB are adapted to be selectively triggered with the output control pulse from the one-shot multivibrator, dependent upon the existing positions of the selector switch S3 and the number of switchboards SB that do receive the one-shot output control pulse determines the magnitude of the welding current pulse applied to the welding tips 18 and 19.

A suitble circuit breaker 20 is preferably connected in series with the battery power supply 17 and acts as a protective circuit in the case of a shorted power switchboard. Additionally, a suitable indicating lamp 21 is provided and becomes lit when the circuit breaker 20 is operated to connect the battery supply 17 in series with the power switchboards SB; whereas, indicator lamp 22 is connected across the power switchboards SB to warn the operator of a circuit short therein.

The illustrated circuit embodiment of the present invention is adapted to be energized with the usual 115 volt A.C., upon closure of the power on and off switch 23. This A.C. input voltage is applied to a 12 volt D.C. power supply 24 which converts the input A.C. into a nominal 12 volts D.C. which, in turn, is used to energize that portion of the illustrated circuitry (including the one-shot multivibrator Q1–Q2) which produces the control pulse trigger for the switchboards SB1 through SB10. The 12 volt output from the power supply 24 is applied across the voltage dividing resistor string 10–11 and charges the capacitor 14 to a predetermined portion of the 12 volt supply. When the operator wishes to perform a welding operation, he depresses the foot switch S1 and thereby discharges the capacitor 14.

The capacitor 15 and resistors 12 and 13 form a conventional differentiating circuit which differentiates the voltage across the capacitor 14 and thereby produces a negative voltage pulse upon actuation of the foot operated switch S1. This negative pulse is applied, via diode 16 and resistor 25, to cut off the diode 26 which is connected to the base of transistor Q1 in the one-shot multivibrator circuit and which causes the one-shot multivibrator to normally be in that operating state wherein transistor Q1 is conducting and transistor Q2 is cut off. The remaining quiescent operating voltages for the one-shot multivibrator stage are applied through: resistor 27 which connects the collector of transistor Q1 to the positive side of the 12 volt supply; resistor 28 and diode 29 which connect the collector of transistor Q2 to this positive supply voltage; and, resistors 30 and 31 which respectively connect the base of transistor Q2 to the collector of transistor Q1 and to the ground or negative side of the 12 volt supply.

Consequently, when the negative pulse produced at the above-described pulse forming network is applied to the base of transistor Q1, this transistor Q1 is cut off and a resulting positive-going signal is coupled, via capacitor 32, to the base of transistor Q2 and drives it into conduction. In accordance with conventional one-shot multivibrator theory, a negative-going voltage signal now appears at the collector of transistor Q2 and is coupled, via diode 33, capacitor 34, the resistor value then connected between decks S2B and S2C of switch S2, resistor 25 and diode 26, back to the base of transistor Q1 and thus driving it further into cut-off. In other words, the operation of transistor Q1 and Q2 is cumulative.

At a time rate determined collective by the value of capacitor 34, the resistance value selected by the switch S2 and the value of resistors 35 and 36, the base of transistor Q1 rises above cut-off and the one-shot multivibrator is once again restored to its normal condition, with transistor Q1 conducting and transistor Q2 cut off. As a result, the one-shot multivibrator produces a negative square wave output pulse (in the collector circuit of transistor Q2) whose pulse width is equal to the length of time during which the transistor Q2 is permited to conduct and is therefore determined by the position of switch S2.

More specifically, the switch S2 is illustrated as having eleven different positions; ten of which function to connect preset potentiometers, such as those designated at 37 and 38, across the resistor 35 and in the discharge circuit for capacitor 34 so that the width or duration of the one-shot output pulse is variable in discrete two millisecond steps, for example, whereas, in its eleventh position, the switch S2 connects helipot 39 in multiple with resistor 35 so that the pulse duration of the one-shot output can be varied continuously between predetermined limits.

The negative output pulse from the one-shot multivibrator Q1–Q2 is subsequently applied, via resistor 40, to the base of transistor Q3 which, together with transistors Q4 and Q5, forms a pulse power amplifier. More specifically, when the negative output pulse from the one-shot is applied to the base of transistor Q3, the transistor Q3 operates as an emitter follower and produces a corresponding, amplified square wave pulse across its emitter resistor 41. This emitter pulse from transistor Q3 is coupled, through diode 42, to the base of transistor Q4 where it is effective to reduce the bias that is normally applied here through resistor 43 and thus causes a positive output pulse to appear between collector resistors 44 and 45. This positive output pulse is then coupled to the base of transistor Q5 to produce, a cross the emitter resistor 46, an amplified positive square pulse which is applied to the wiper arm of switch S3.

Referring back to the one-shot multivibrator circuitry including transistors Q1 and Q2, the diode 33 and resistor 47 serve to improve the rise time at the end of the negative output pulse from the one-shot; whereas, the Zener diode 48 is connected across the transistor Q2 to suppress possible firing of the one-shot because of line transients and to reduce time variation of the one-shot operating period.

As mentioned previously, the switch S3 is employed to selectively apply the positive square pulse from the output of transistor Q5 to one or more of the power switchboards SB1 through SB10, in accordance with the desired amplitude of the welding current pulse. More specifically, it will be observed that switch S3 has a plurality of output terminals S3A through S3J corresponding to the number of power switchboards provided. Additionally, the switch S3 has an OFF position (as shown) in which none of the ten illustrated output terminals are connected to receive the positive square pulse from transistor Q5. In the illustrated embodiment of the present invention, it is assumed that ten power switchboards are provided. However, it should be understood at this time that may more power switchboards might be used, depending upon the requirements of practice.

Only power switchboard SB1 is shown in detail, since the remaining switchboards SB2 through SB10 are similarly constructed and operate in exactly the same manner as power switchboard SB1. As mentioned previously, these power switchboards are connected in parallel with one another and in series between the battery power supply 17 and the welding tips 18 and 19, for the purpose of controlling the magnitude of the current supplied by the battery power supply 17 to such welding tips, in a manner now to be described.

Specifically, the typical power switchboard SB1 comprises: common emitter amplifier transistor Q6; emitter follower transistor Q7; and, switching transistors Q8 and Q9. Assuming that switch S3 is positioned such that its wiper arm is connected to output terminal S3A, the positive square pulse produced at the output of transistor Q5 is applied, via resistor 49, to the resistor-capacitor combination 50–51 at the base of transistor Q6 where it is effective to cause this transistor Q6 to conduct. As a result, collector current flows through resistor 52 and a negative pulse is thus produced and is coupled, via resistor 53, to the base of emitter follower transistor Q7. The corresponding negative square pulse that is developed at the junction of resistor 54 and diode 55 is then applied, through resistors 56 and 57 respectively, to the bases of switching transistors Q8 and Q9, thereby causing them to conduct and connect the positive terminal of battery supply 17 to the welding tip 19 for the duration of the applied control pulse (assuming of course that circuit breaker 20 has previously been closed). Consequently, a welding current pulse now flows in the series circuit extending from the positive terminal of battery supply 17, through the triggered switchboard SB1, between welding tips 19–18, and back to the negative terminal of battery supply 17. This welding current pulse is comprised of the combined currents of transistor stages Q7, Q8 and Q9 and, in practice, equals about 80 amperes in parallel with the current from the other switchboards.

The collector resistors 58 and 59 limit the amplitude of this welding current pulse and furthermore are selected to make the switchboard SB1 appear as a very high impedance when compared to the variable resistance of the weld, so that variations in this weld resistance will not adversely affect the magnitude of the applied welding current pulse. For reasons previously pointed out, this is very desirable. Moreover, the typical power switchboard SB1 includes the diodes 55 and 60 which operate to reverse the bias on the bases of transistors Q8 and Q9 while power is turned off and, in addition, these diodes, along with the biasing resistors 49 and 54, keep the leakage current per switchboard to a minimum.

The remaining power switchboards SB2 through SB10 are constructed in essentially the same manner as switchboard SB1 and are selectively rendered effective to connect the battery 17 to the welding tips 18 and 19 in accordance with the existing position of the progressive shorting switch S3. In other words, as higher and higher weld currents are desired, the wiper arm of switch S3 is rotated clockwise so that more and more of the power switchboards receive the output control pulse from the transistorized control circuitry illustrated in the upper half of the drawing.

From the foregoing discussion, it will be noted that the resistance welder provided by the present invention produces a welding pulse whose current magnitude and duration can be independently controlled to a high degree of accuracy; the weld current pulse magnitude remains substantially constant regardless of changes in the resistance of the weld being made; and, the welding pulse is constant from day to day and from machine to machine.

Because of these welding pulse characteristics, the proposed resistance welder offers the following advantages over the persently used capacitor welders.

(1) Settings are uncritical as to current, pulse-time, and tip pressure after a well-defined minimum has been exceeded. This permits far greater variability in operator and material without ill effect.

(2) No longer is it necessary to work out schedules of settings for each machine; it is now feasible to prepare a single manual of settings which may be used on all machines. This may be done with far greater care and completeness than has been possible heretofore.

(3) It is no longer necessary to make the usual twice-daily calibration.

(4) The best combination of current and time for each pair of materials may now be used.

Obviously, many modifications and variations of the present invention are possible in the light of the above teachings. It is therefore to be understood that within the scope of the appended claims, the invention may be practiced otherwise than as specifically described.

What is claimed is:

1. Electrical resistance welding apparatus comprising,
a pair of electrodes,
an electrical power source,
a plurality of switching circuit means each having conducting and nonconducting states operably connected in circuit parallel with one another and in circuit series between said electrical power source and said pair of electrodes,
a plurality of impedance means each connected in series with a corresponding one of said switching circuit means,
an input trigger pulse source including means for varying the width of said trigger pulses, and
control means interconnecting said trigger pulse source to said switching circuit means and comprising a multiple position switching means for receiving and selectively supplying said trigger pulses from said trigger pulse source simultaneously to any desired number of said plurality of switching circuit means,
each of said switching circuit means normally being in its nonconducting state and being actuated to said conducting state while said control means is supplying an input trigger pulse for connecting said pair of electrodes in circuit series with said electrical power source through said desired number of switching circuit means and throughout the duration of said input trigger pulse, whereby the magnitude of current supplied to said pair of electrodes by said power source is varied dependent upon which of said switching circuit means are actuated.

2. The apparatus specified in claim 1, further including pulse width control means operably connected to said trigger pulse source for adjusting the width of said trigger pulses.

3. The apparatus specified in claim 1, wherein said trigger pulse source includes a one-shot multivibrator circuit adapted to produce an output pulse whose pulse width is dependent upon a variable resistance value contained within said multivibrator circuit.

4. The resistance welder specified in claim 1 wherein the resistance of a weld made by said resistance welder is small when compared to said predetermined circuit impedance, whereby the magnitude of the current supplied to said electrodes remains substantially constant during variations in said weld resistance.

5. The resistance welder as specified in claim 3 wherein the variable resistance value within said multivibrator circuit comprises a plurality of potentiometers each of which is preset to cause said multivibrator output pulse to have a distinct pulse width, and further including switching means for selectively connecting a selected one of said preset potentiometers into said multivibrator circuit dependent upon the desired duration of the welding current.

6. The resistance welder as specified in claim 5 and further including a manually variable resistor adapted to be connected into said multivibrator circuit by said switching means, whereby the width of the output pulse from said multivibrator is continuously variable between predetermined limits.

References Cited

UNITED STATES PATENTS

| | | | |
|---|---|---|---|
| 1,587,996 | 6/1926 | Warren | 338—201 |
| 3,233,116 | 2/1966 | Waltrous | 219—114 X |
| 3,234,354 | 2/1966 | Penberg | 219—108 |
| 3,317,703 | 5/1967 | Gilbert | 219—110 X |
| 3,042,786 | 7/1962 | Babcock et al. | 219—110 |

JOSEPH V. TRUHE, Primary Examiner

J. G. SMITH, Assistant Examiner

U.S. Cl. X.R.

323—25